United States Patent [19]

Sasage et al.

[11] Patent Number: 4,705,266
[45] Date of Patent: Nov. 10, 1987

[54] SHEET CONVEY DEVICE

[75] Inventors: Tsutomu Sasage; Minoru Matsumoto; Toru Yoshikawa, all of Tokyo, Japan

[73] Assignee: NEC Corporation, Japan

[21] Appl. No.: 930,790

[22] Filed: Nov. 12, 1986

[30] Foreign Application Priority Data

Nov. 22, 1985 [JP] Japan .................... 60-180863[U]

[51] Int. Cl.⁴ ............................................ B65H 51/06
[52] U.S. Cl. ................................. 271/264; 271/31.1; 271/149; 271/179
[58] Field of Search ............... 271/179, 251, 264, 149, 271/314, 275; 198/785, 786; 209/539, 900

[56] References Cited

U.S. PATENT DOCUMENTS

| 2,826,413 | 3/1958 | Brodie et al. | 271/179 |
| 3,038,587 | 6/1962 | Bilocq | 198/786 |
| 3,791,731 | 2/1974 | Mihalik | 271/264 X |
| 4,346,876 | 8/1982 | Guenther et al. | 271/31.1 X |
| 4,595,188 | 6/1986 | Wiley et al. | 271/31.1 X |

Primary Examiner—H. Grant Skaggs
Assistant Examiner—Lisa Waag
Attorney, Agent, or Firm—Laff, Whitesel, Conte & Saret

[57] ABSTRACT

A sheet convey device includes a plurality of feed rollers for conveying a sheet in a standing state, and guide plates for guiding the sheet to be conveyed. The device has helical rings, wound on two ends of the feed rollers in different winding directions, for guiding the sheet toward the central portions of the feed rollers.

5 Claims, 6 Drawing Figures

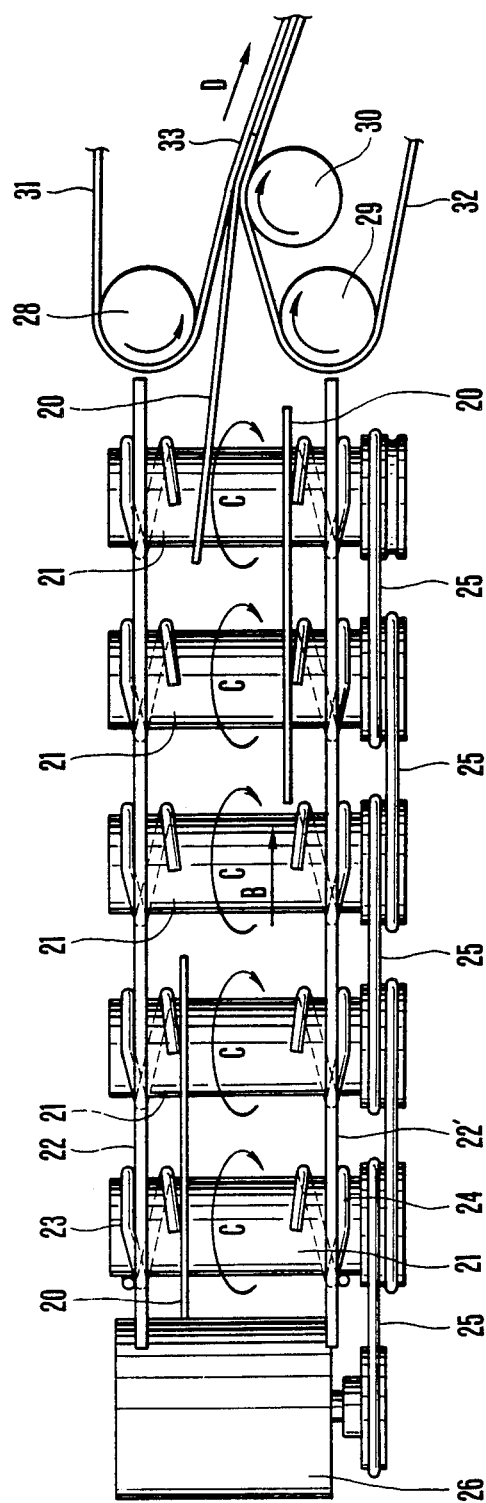

SHEET CONVEY DEVICE

BACKGROUND OF THE INVENTION

The present invention relates to a sheet convey device and, more particularly, to a sheet convey device of an automatic processing device for postal materials or the like, which conveys postal materials in a standing state.

FIG. 1 is a front view of an example of a conventional sheet convey device.

A conventional sheet convey device of this type consists of a convey means, including a cylindrical feed roller 1, and guide plates 2 for guiding a sheet 10 in a standing state, as shown in FIG. 1. The sheet 10 in the standing state is guided and conveyed between the guide plates 2 while its lower end contacts the feed roller 1 rotating in the direction of arrow C.

In the conventional sheet convey device described above, the sheet 10 can be erroneously guided into a gap 2a or 2b defined by the feed roller 1 and the guide plates 2, as shown in FIG. 1, and is thus stopped, stuck, or damaged.

SUMMARY OF THE INVENTION

It is an object of the present invention to provide a sheet convey device free from such conventional drawbacks.

A sheet convey device according to the present invention comprises convey means including a plurality of feed rollers for conveying a sheet in a standing state, a guide portion for guiding the sheet to be conveyed, and helical rings, wound on two ends of the feed rollers in different winding directions, for guiding the sheet toward the central portions of the feed rollers.

BRIEF DESCRIPTION OF THE DRAWINGS

FIG. 3A, 3B, and 3C are plan, front, and side views, respectively, of a sheet convey device according to another embodiment of the present invention.

DETAILED DESCRIPTION OF THE PREFERRED EMBODIMENTS

The present invention will be described with reference to the accompanying drawings.

Figure 1:
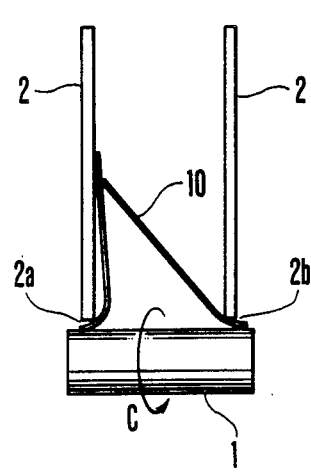
FIG. 1 is a front view for explaining a conventional technique.
Figure 2A:
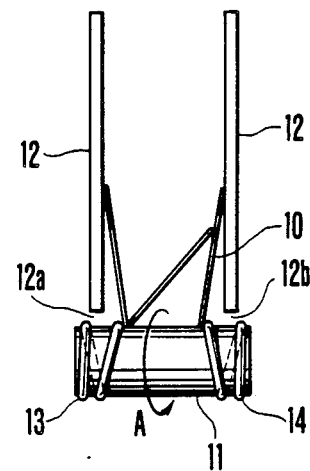
FIGS. 2A and 2B are front and side views, respectively, of a sheet convey device according to an embodiment of the present invention.
Figure 2B:
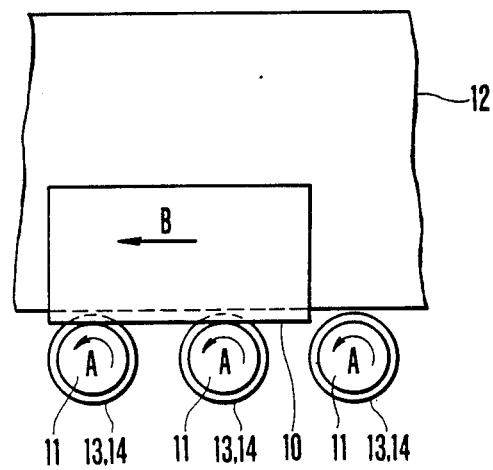

FIGS. 2A and 2B are front and side views, respectively, of a sheet convey device according to an embodiment of the present invention.

The sheet convey device of this embodiment consists of a plurality of feed rollers 11, helical rings 13 and 14 wound on two end portions of each feed roller 11, and two guide plates 12 for guiding a sheet 10 in a standing state.

The helical rings 13 and 14 are coiled in different directions and are wound on the two ends of each feed roller 11. When the feed roller 11 is rotated in the direction of arrow A, the lead directions of the rings 13 and 14 are directed to the central portion of the feed roller 11.

With the above arrangement, when the sheet 10 is conveyed between the guide plates 12 in the direction of arrow B, its lower end contacts the feed roller 11 rotating in the direction of arrow A and follows the lead directions of the helical rings 13 and 14. Therefore, the sheet 10 is conveyed in the direction of arrow B while it is guided to the central portion of the feed roller 11.

In this embodiment, the helical rings 13 and 14 are wound on every ones of the plurality of feed rollers 11. However, the present invention is not limited to this. The helical rings can be wound only on a required one (ones) of the feed rollers.

Figure 3B:
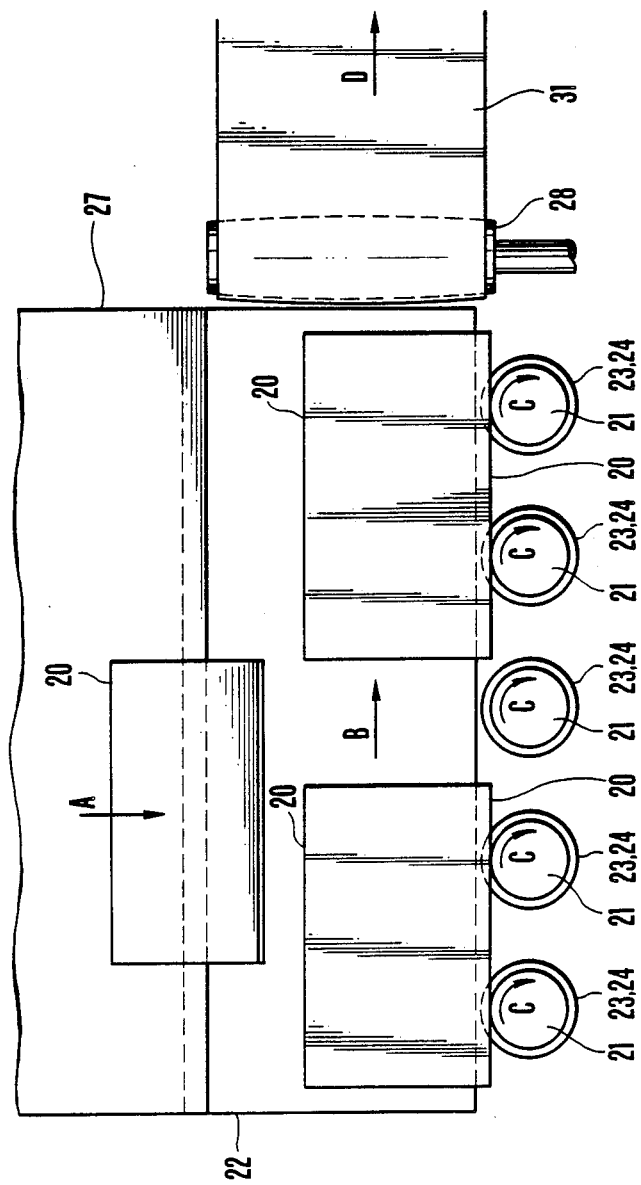
Figure 3C:
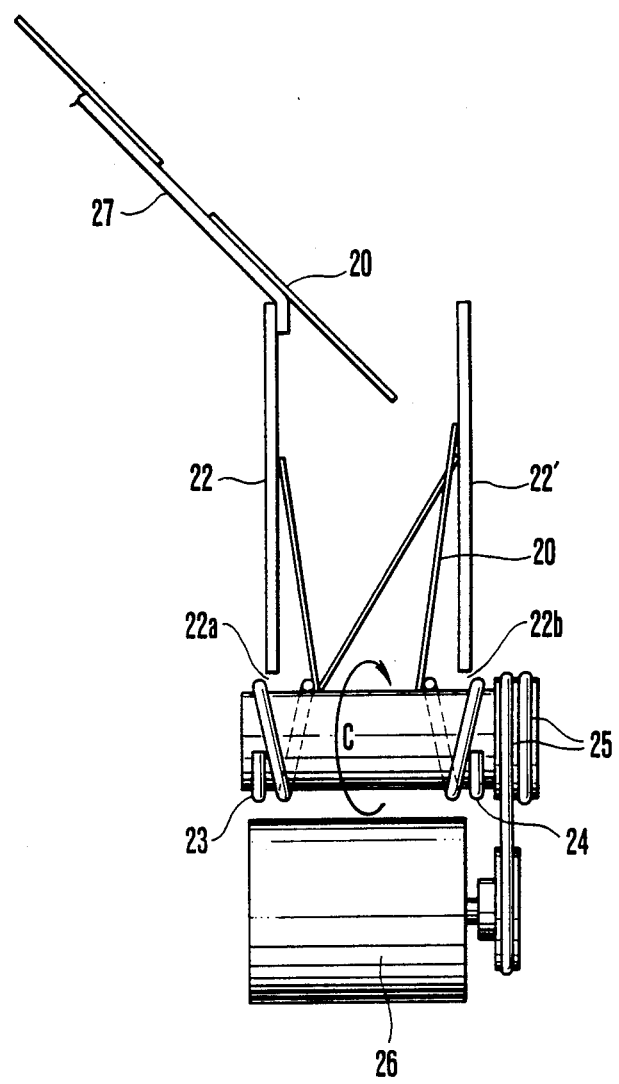

FIGS. 3A, 3B, and 3C are plan, front and side views, respectively, of a sheet convey device according to another embodiment of the present invention.

Referring to FIGS. 3A, 3B, and 3C, a plurality of feed rollers 21 are arranged to be parallel to each other at equal intervals. The interval between the feed rollers 21 is set to be shorter than the length of the conveyed sheet along the travel direction (B). The corresponding ends of adjacent feed rollers are coupled through a belt 25, and the end feed roller (leftmost roller in the drawing) is coupled to the shaft of a motor 26 through a fixed pulley and a belt 25. In this manner, when the motor 26 is driven, each feed roller 21 rotates in the same direction indicated by arrow C. Helical rings 23 an 24 are wound on two end portions of each feed roller 21.

The helical rings 23 and 24 are coiled in different directions and are wound on the two end portions of each feed roller 21. When the feed roller 21 is rotated in the direction of arrow C, the lead directions of both the rings 23 and 24 are directed to the central portion of the feed roller 21.

Guide plates 22 and 22' are vertically disposed above the two end portions of the feed rollers 21 to be parallel to each other. The lower ends of the guide plates 22 and 22' are separated from the helical rings 23 and 24 by gaps 22a and 22b so that they do not contact the helical rings 23 and 24. The distance between the guide plates 22 and 22' is appropriately determined such that a sheet to be conveyed can move in a standing state wherein it leans on the guide plate 22 or 22'. In this manner, a feed path is defined by the feed rollers 21 and the guide plates 22 and 22'.

An inclined plate 27 is fixed to the upper end of the guide plate 22. Sheets 20 slide along the inclined plate 27 and dropped onto the feed path.

Rollers 28, 29, and 30, which are rotated by corresponding vertical shafts, are provided at an exit of the feed path, and are driven in the direction of arrows, respectively. A belt 31 extends between the roller 28 and another roller (not shown). A belt 32 extends between the rollers 29 and 30, and another roller (not shown). The belts 31 and 32 open toward the feed path, are narrowed in opening by the roller 30, and then extend parallel to each other, thus defining a clamp path 33.

With the above arrangement, when a sheet 20 is slipped along the inclined plate 27 and is thus supplied to the feed path, it is conveyed in the standing state between the guide plates 22 and 22' along the direction of arrow B. The lower end of the sheet 20 contacts the feed rollers 21 rotated in the direction of arrow C and follows the lead directions of the helical rings 23 and 24. Therefore, the sheet 20 is conveyed in the direction of arrow B while it is guided toward the central line of the feed path. The sheet 20 is clamped between the belts 31 and 32 by means of the last feed roller 21 and is conveyed in the direction of arrow D.

In this embodiment, helical rings 23 and 24 are wound on all of the plurality of feed rollers 21. However, the present invention is not limited to this. Helical rings can be wound only on a required one (ones) of the feed rollers.

Although the intervals of the plurality of feed rollers 21 are set to be equal in this embodiment, they need not be equal.

In this embodiment, the inclined plate 27 is fixed only on one guide plate 22. However, the inclined plates 27 can be fixed on both the guide plates 22 and 22'. Also, the guide plates can be provided on only a portion of the feed path.

As described above, according to the present invention, since helical rings are provided on two ends of the feed rollers, a sheet is conveyed while it is guided toward the central portion of the feed rollers. As a result, the sheet will not be erroneously inserted between the feed rollers and the guide plates, thus constantly, stably conveying a sheet in the standing state.

What is claimed is:

1. A sheet convey device having convey means including a plurality of feed rollers for conveying a sheet in a standing state, and a guide portion adjacent said feed rollers for guiding and supporting the sheet to be conveyed, wherein said device further comprises helical rings, wound on two ends of at least one of said feed rollers in different winding directions, for guiding the sheet toward central portions of said feed rollers.

2. A device according to claim 1, wherein a plurality of said rings are mounted on a plurality of said feed rollers.

3. A sheet convey device comprising:
a plurality of feed rollers which are horizontally disposed in parallel to each other at an interval and rotated in a same direction for conveying sheet-like materials which are dropped onto tops of said feed rollers in a standing state, said interval being set to be shorter than a length of the conveyed sheet-like materials, each feed roller having helical rings wound on both end portions thereof in different winding directions;
two guide plates which are disposed vertically above said respective both end portions of said feed rollers so that lower ends of said guide plates do not contact said helical rings of the feed rollers, a distance between said two guide plates being determined such that the sheet-like materials to be conveyed can be moved in their standing states while they lean on either one of said guide plates;
at least one inclined plate fixed to the upper end of at least one said guide plate for causing the sheet-like materials to be slided therealong and dropped into a feed path formed by said feed rollers and said guide planes; and
sheet clamping means disposed at an outlet position of said feed path, for clamping the sheet-like materials conveyed out by the last feed roller to convey them to other position.

4. A device according to claim 3, wherein two adjacent feed rollers are coupled through a belt and the feed roller positioned on an inlet portion of said feed path is coupled with an axis of a drive motor through a belt.

5. A device according to claim 3, wherein said clamping means comprises a plurality of rollers rotated about corresponding vertical shafts and two vertical belts extended between said rollers, said rollers and said vertical belts are disposed in such manner that two of the plural rollers are disposed at positions which are outlet side ends of said guide plates, respectively, and are rotated in different directions, third roller is disposed so as to form a triangle together with said two rollers, one of two vertical belts is extended around the rollers including one of said two rollers and said third roller, and another vertical belt is extended around the rollers including the other of said two rollers, thereby a triangle-shaped opening being formed against the sheet-like materials exhausted from said feed path, the sheet-like materials being gripped by the two vertical belts at the third roller.

* * * * *